March 23, 1954  R. C. ULM ET AL  2,673,001
TANK STRUCTURE
Filed June 30, 1952  3 Sheets-Sheet 1
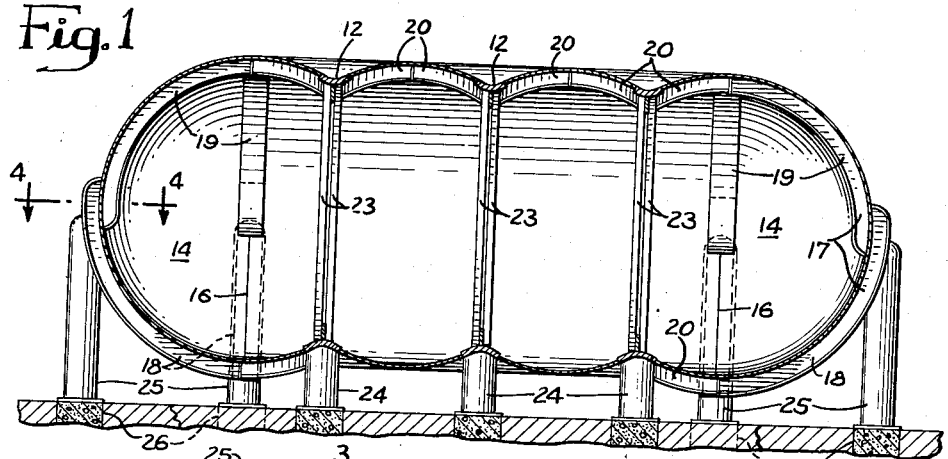
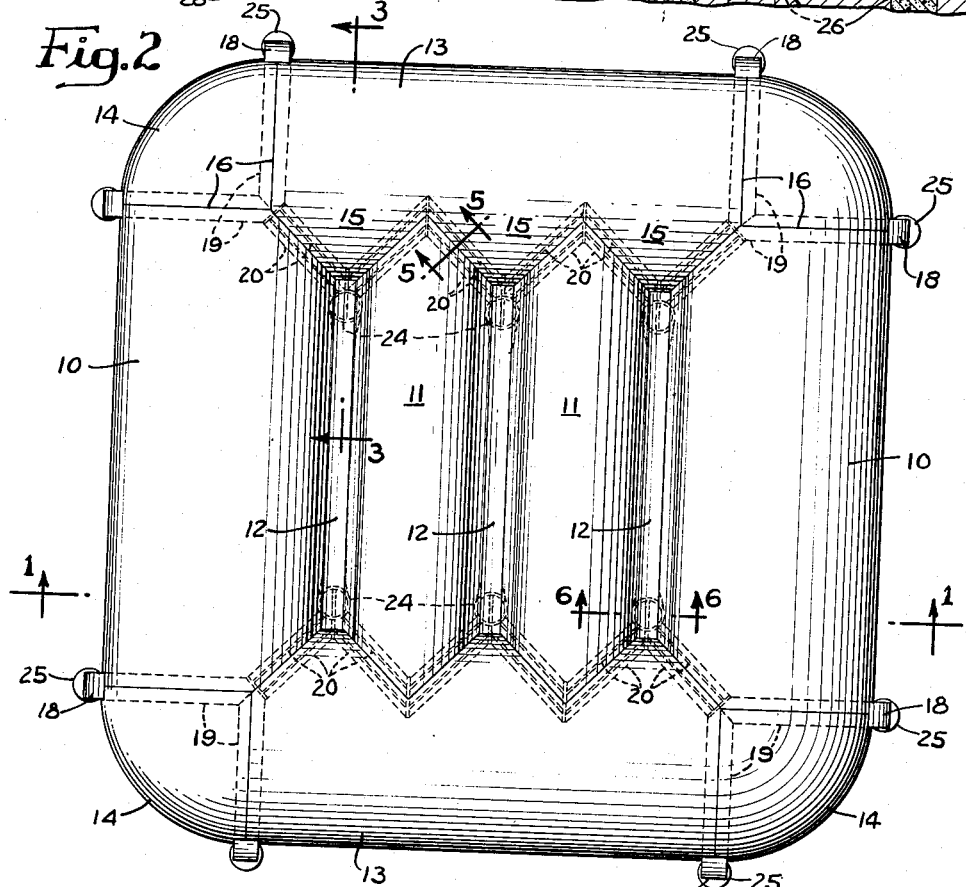
INVENTOR.
REIGN C. ULM
BY EDWIN WETTERSTROM
F. D. Prager Atty.

March 23, 1954 R. C. ULM ET AL 2,673,001
TANK STRUCTURE
Filed June 30, 1952 3 Sheets-Sheet 2
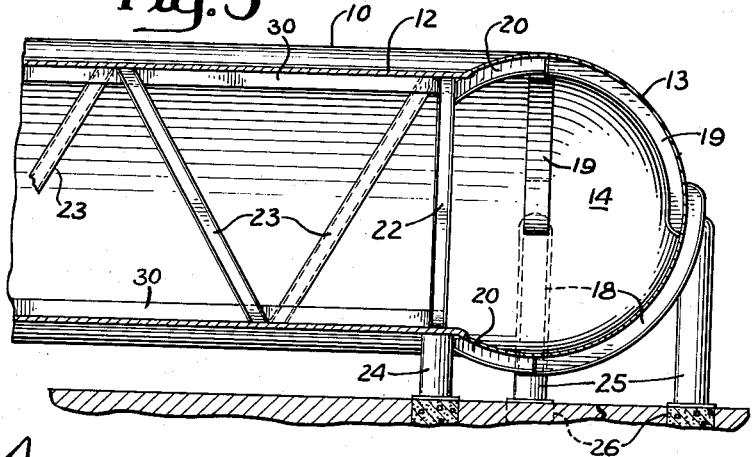
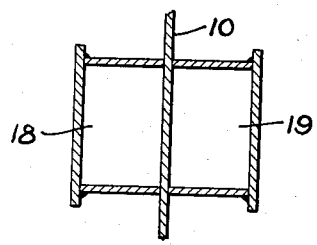
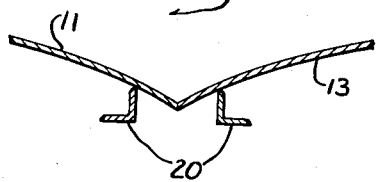
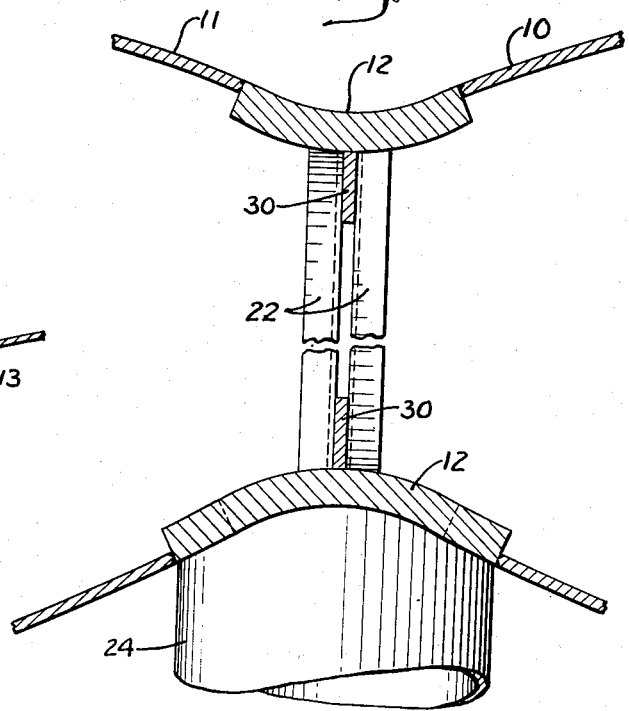
INVENTOR.
REIGN C. ULM
BY EDWIN WETTERSTROM
Atty.

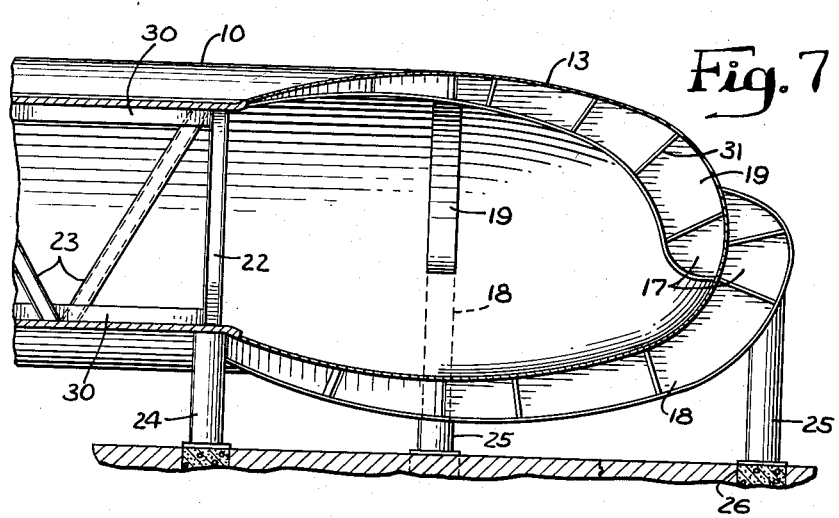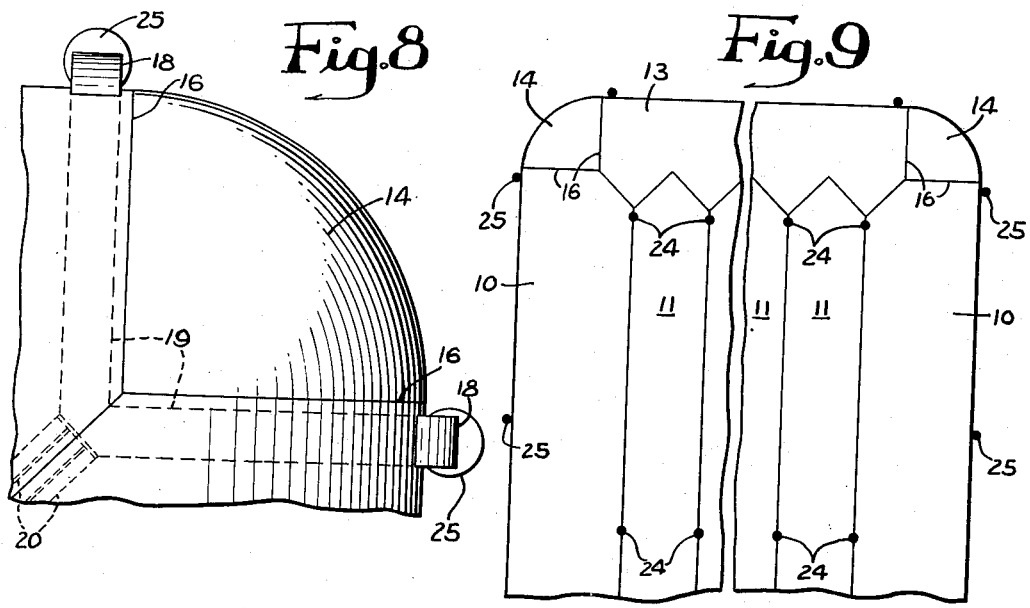

Patented Mar. 23, 1954

2,673,001

UNITED STATES PATENT OFFICE 2,673,001

TANK STRUCTURE

Reign C. Ulm, Schererville, Ind., and Edwin Wetterstrom, Chicago, Ill., assignors to Graver Tank & Mfg. Co., Inc., East Chicago, Ind., a corporation of Delaware Application June 30, 1952, Serial No. 296,352

4 Claims. (Cl. 220—1)

1

This invention relates to tank structures, particularly for the storage of large amounts of liquid, for instance in gasoline refineries, municipal water systems, etc.

It has been proposed to build tanks of this type in generally square or rectangular form, as seen in plan view, and to form them substantially of cylindrically shaped plates. The generally square form provides maximum utilization of ground area and the preponderance of cylindrically shaped plates insures economy in fabrication and construction.

It is also known that reinforcement and supports are important problems for tanks of this kind. With regard to these problems, the new design is improved.

Heretofore tanks of this kind were expected to rest substantially directly and broadly on the ground. It was assumed that such an arrangement provides uniform distribution of load reactions. Actually such was not the case. As a result of practically unavoidable, irregular settlement, washout and other disturbances of the ground, the tanks actually were supported by irregularly distributed ground areas. Irregular stresses were thus imposed, causing danger of local over-loads unless excessive strength was incorporated in the entire plate structure.

These problems and their solution by the new design will be understood more clearly upon a study of the detailed description which follows and which refers to specific examples of the invention; it being understood that variations are possible within the scope of the claims appended hereto.

In the drawing:

Figure 1 is a vertical diagrammatic section through a tank in accordance herewith, along lines 1—1 in Figure 2.

Figure 2 is a plan view of said tank.

Figure 3 is a vertical section along lines 3—3 in Figure 2.

Figure 4 is a detail section along lines 4—4 in Figure 1.

Figure 5 is a detail section along lines 5—5 in Figure 2.

Figure 6 is a detail along lines 6—6 in Figure 2.

Figure 7 is a modification of Figure 3.

Figure 8 is a modification of a detail from Figure 2.

Figure 9 is another modification of Figure 2.

The tank substantially consists of a series of parallel horizontal cylinder sections. These sections are shown as being terminally interconnected by transverse horizontal cylinder sections, with spherical sections at the four corners. Four parallel cylinder sections are shown in Figure 2 but this number as well as the proportion of length to width can be modified within wide limits as suggested in Figure 9. The typical height of a tank of this kind, from bottom to top of the cylinder sections, ranges between about ten and forty-five feet. There is hardly any upper limit to the horizontal dimensions of the tank, except that for reasons of maintenance it may be undesirable to exceed horizontal distances of a few hundred feet.

The outermost parallel cylinder section walls 10 merge with the inner parallel cylinder section walls 11 by means of parallel elongated wall sections 12 which for reasons appearing hereinafter have a reverse bend, thereby providing a wavy contour or cross section in the top and bottom of the tank, as best shown in Figure 1. The transverse cylinder section walls 13 are interconnected with the outer parallel cylinder section walls 10 by sphere section walls 14 and with the inner portions of the tank by what may be called groin section walls 15, the boundaries between such walls extending substantially along the natural geometrical intersection lines of the different cylinders and spheres.

In order to justify the use of economical plate material the tank must be protected from being flexed and ballooned out downwardly by liquid load or upwardly as well as downwardly by vapor load; and as mentioned above it must also be protected against irregular load reactions due to irregular ground support. It must further withstand a snow load, or sometimes an interior partial vacuum load, and a more or less significant wind load. For these purposes the new design provides a system of girders, trusses and support posts, formed and integrated with the tank structure itself as follows.

Along the intersection lines 16 between the outer cylinder sections 10, 13 and the spherical corners 14 there are provided ring girders generally designated by numeral 17. Eight such ring girders are shown, two at each corner, in vertical planes which are at right angles to one another and to the cylinder axes. Each ring girder is substantially C-shaped, covering an arc of substantially 180 degrees. In order to facilitate construction of the tank, the lower part 18 of each ring girder is best installed on the outside of the shell plates 10, 13 and the upper part 19 of each ring girder on the inside thereof. It is then possible to support the different plates on the preassembled ring girders; particularly if such girders are constructed with a box shape in cross section as shown in Figure 4, which also provides structural advantages to be explained hereinafter. In order to safeguard access to the welded intersection lines 16 the box-shaped girders (Fig. 4) are best installed adjacent but not over these lines (Fig. 8).

Every set of two ring girders 17, for a corner 14, is shown as having connected thereto two groin or intersection girders 20; one extending from the upper joint of the two ring girders toward the inside of the tank roof, and the other groin girder similarly disposed at the bottom of the tank. Similar groin girders are also shown at the other groin intersections 15, not only in the corners. Preferred cross sections of such groin girders are shown in Figure 5. They are provided by a pair of structural angle members, suitably curved, extending along and symmetrically with the groin intersection line but spaced therefrom to provide access. Gussets or the like may interconnect the two members of each groin girder.

The inner ends of every pair of superposed groin girders 20 are vertically interconnected by a post 22. Such posts are located substantially at the apex portions of the groin sections 15 adjacent the corners 14. With the horizontal wall sections 12 they form rectangular frames lying in vertical planes.

Vertical truss panels are formed by these vertical frames together with diagonal truss members 23, extending substantially within the planes defined by the frame elements 12 and 22.

Each truss 12, 22, 23 is shown in Figures 1 to 3 as supported by two terminal support posts 24. In case of long cylinder sections and trusses (Figure 9), additional support posts may be desirable, while in other cases, one or none may be used.

Basic peripheral support is provided for the tank by ring girder support posts 25, and at least one such post is used for each ring girder 17. As indicated in Figure 9, ring girders and support posts 25 for the same may also be required between the rounded corners 14, depending on the length of the cylinders 10 and 13 and the weight of liquid stored therein. The posts 25 preferably have their upper ends attached substantially to the outermost portions of the C-shaped ring girders as shown in Figures 1 and 3. This involves a substantial column height of the posts, but minimum strength requirements for the ring girders themselves. As best shown in Figure 7 it is possible and sometimes desirable to taper the vertical width of these ring girders progressively from the point where their load reactions are transmitted to their support posts. However, as indicated in Figure 3 it may be simpler to use a uniform vertical width for each girder element 18, 19.

Suitable foundations 26 must be provided for the different support posts 25 and 24. The tank can then be expected to be free from the problems caused by irregular soil support as mentioned above. The support posts 24 and 25, as indicated in Figure 7, may vary considerably in height. This height may be a few inches or more than hundred feet. In the latter event the parts must be dimensioned and/or braced in suitable manners, well known to the art.

Regardless of the presence of the support posts and foundations it is also possible to bring soil or sand or the like in direct contact with the bottom of the tank, or to bury the entire tank. However, it is generally better to keep the tank and the different weld seams and fixtures thereof accessible for inspection, painting and other maintenance operations.

If a tank is used for the storage of volatile liquids such as gasoline or for the storage of gas the shell is subject to variable internal pressure. These pressures will generally impose vertical tension loads on the internal trusses 12, 22, 23. Such tension is easily absorbed by the posts 22 and diagonal truss members 23 if these parts are properly dimensioned and designed for the magnitude of internal pressure to be expected.

Moreover the diagonal members 23 resist bending loads due to the presence of liquid loads. Heretofore, vertical tie members were used exclusively, between the elongated reverse bent plate sections 12; the lower sections 12 being expected to be uniformly supported by the ground. Equal strength against vapor loads and considerably greater resistance against liquid loads is provided by the new combination of support posts and trusses, at no appreciable extra cost.

The internal gas or vapor pressures mentioned impose tension loads on substantially all shell portions of the tank. The reverse bend portions 12, by themselves, are subject to a pressure, in such operation, which tends to flatten them or balloon them out into an inwardly concave form. However, such tendency is counteracted by the inward tension imposed on the reverse bend members by the truss members 22, 23. Incident to increase or decrease of internal pressure, the exact shape of the reverse bend sections 12 is likely to change, although not as much as the cylinder sections 11. In other words there is likely to be present what is generally called "breathing" of the tank, to a minor extent such as a few small fractions of an inch. It is best to minimize such breathing and the attendant flexing since the occurrence and periodic reversals of concentrated stresses and resulting strains will weaken the tank shell and reduce the normal service life thereof.

Maximum service life and stress resistance, at minimum cost, can be expected from a reverse bend section 12 designed as best shown in Figure 6. Here the tension of the shell plate members 10, 11, imposes stresses upon the reverse bend sections 12, which stresses are directed transversely of the length of the reverse bend sections and slightly upward at the edges of said sections. Along the middle of each reverse bend section these stresses are channeled into the vertical planes of the trusses 12, 22, 23. This operation is most simply and most reliably performed by butt-welding the plate sections 10, 11 to the reverse bend sections 12 as shown; by fillet-welding a bar 30 to the longitudinal center line of each reverse bend section, inside the tank, and suitably welding the posts and diagonal truss members 22, 23 to this bar.

For reasons well understood by persons skilled in the art of structural design, the reverse bend members 12 are made substantially heavier than the plates 10 or 11, the thickness of both however being variable, depending mainly on the maximum amount of interior gas or vapor pressure to be expected. It will also be understood that the exact width of a reverse bend section depends on structural and welding details, including mainly the required size of posts 24 and truss members 22, 23 and proportional spacing of the different weld seams over the width of the reverse bend section.

Irrespective of such dimensional details it will be seen that a mere minimum of parts 10, 11, 12,

30, 23 is used. This leads to appreciable savings in fabrication and construction.

In some cases it is even possible to reduce the parts used further, by using a solid web plate instead of the truss members 30, 22, 23. This applies mainly when it is important to distribute a vapor load uniformly over a long distance, in a relatively shallow tank. In principle, a plate or web of this kind can be considered as one kind of truss, for present purposes.

The lower reverse bend sections 12 are exposed to the prevailing vapor load plus the hydrostatic load of the liquid if any. For this reason and in order to carry the reaction of the support posts 24, they may have to be made even heavier than the upper reverse bend sections 12.

Additional resistance to loads like that of the liquid is provided mainly by the ring girder support posts 25. In order to distribute the reaction of these supports over a box shaped ring girder as shown in Figure 4, and also to resist twisting, it is best to stiffen the ring girders by gussets 31 extending internally of these girders at substantially right angles to the general direction of the ring girders (see Figure 7). Twisting forces are likely to be imposed mainly by the tendency of intermediate tank portions to sag due to their operating weight.

Thus the system of two ring support posts 25, two ring girders 17, a post 22, two groin girders 20 and a groin support post 24, provides a practically rigid framework at each corner of the tank, additionally reinforced by the integral strength of the connecting sphere section 14 end truss 12, 22, 23 and providing in effect an immovable and rigid end support for the hollow cylinder 10 or 13 extending therefrom. Gravitational downward sagging of such a cylinder, between the terminal support members thereof, would tend to impose tension on the lower parts of the cylinder and compression on the upper parts thereof. Failure of the tank is most likely to occur upon any compression on the plate material, as distinguished from tension thereon. It is therefore important to minimize such compression.

To some extent the inherent rigidity of the cylindrical section itself and mainly of the vertical parts thereof resists the gravitational sagging and resulting compression. To a greater extent, the rigid support structures 17, 20, 22, 24, 25 at the corners 14 are capable of resisting gravitational sagging and concurrent, dangerous stresses. Intermediate members 17, 25, in tanks of large area, provide further aid in this connection.

At the same time it will be seen that the entire reinforcing and supporting truss and ring girder system is simple to fabricate and construct; in fact it simplifies the construction of the shell. It presents no difficulty in connection with the required painting, testing and general maintenance. It makes the square-area tank, formed of cylindrical plates, stronger and safer while adding little or nothing to its cost.

What is claimed is:

1. A closed container comprising a series of primary, substantially cylindrically curved, inwardly concave, relatively thin bottom wall sections with parallel axes lying in a substantially horizontal plane; a vertically superposed, similar series of primary top wall sections; secondary, substantially cylindrically curved, inwardly convex, relatively thick wall sections horizontally spacing the primary bottom sections from one another and substantially tangentially connecting them with one another; similar secondary sections for the primary top sections; truss means forming with each pair of superposed secondary sections a vertically rigid truss coextensive with the secondary sections; substantially C-shaped girder reinforcement means associated with and secured to the outermost primary sections, disposed in planes transverse of the cylinder axes, said reinforcement means being rigid against forces acting in their planes and against forces directed across their planes and having lower parts outside and below the respective primary sections and upper parts inside and below the respective primary sections, with appreciable vertical overlap between the upper and lower parts; and means to support said trusses and reinforcement means and thereby to support the container and contents thereof.

2. A closed container as described in claim 1 wherein each C-shaped girder is substantially box shaped and reinforced by gusset plates extending between the walls of the box shaped girder.

3. A closed container as described in claim 1 comprising additionally a pair of primary, substantially cylindrically curved, inwardly concave, relatively thin wall sections with axes transverse of those of the other primary sections, lying in said substantially horizontal plane, and reenforcement means to form in effect an immovable, rigid support for each primary wall section, adjacent each end of the section.

4. A closed container comprising a series of primary, substantially cylindrically curved, inwardly concave, bottom wall sections with parallel axes lying in a substantially horizontal plane; a vertically superposed, similar series of primary top wall sections; at least one secondary, substantially cylindrically curved, inwardly convex wall section horizontally spacing the primary bottom sections from one another and substantially tangentially connecting them with one another; at least one similar secondary section for the primary top section; truss means forming with the pair of superposed secondary sections a vertically rigid truss coextensive with the secondary section; substantially C shaped girder reenforcement means associated with and secured to the outermost primary section, disposed in planes transverse of the cylinder axes, said reenforcement means being rigid against forces acting in their planes and against forces directed across their planes and having lower parts outside and below the respective primary section and upper parts inside and below the respective primary sections, with appreciable vertical overlap between the upper and lower parts; and means to support said trusses and reenforcement means and thereby to support the container and contents thereof.

REIGN C. ULM.
EDWIN WETTERSTROM.

References Cited in the file of this patent

UNITED STATES PATENTS

| Number | Name | Date |
|---|---|---|
| 2,164,660 | Miller | July 4, 1939 |
| 2,273,601 | Thomas | Feb. 17, 1942 |
| 2,380,089 | Ulm | July 10, 1945 |